United States Patent
Badakere Ramachandra et al.

(10) Patent No.: US 8,879,382 B2
(45) Date of Patent: Nov. 4, 2014

(54) PARTIAL FAILURE MESSAGING

(75) Inventors: Venkatesh Badakere Ramachandra, San Jose, CA (US); Apurva Mehta, Cupertino, CA (US); Jagadishchandra Sarnaik, Gilroy, CA (US); Gazal Sahai, Santa Clara, CA (US); Roopa Bayar, San Jose, CA (US); Rohini Kasturi, Livermore, CA (US); Ram Prasad, Bangalore, IN (US); Sreenivasa Tellakula, San Jose, CA (US); Vitaly Dzhitenov, Needham, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 366 days.

(21) Appl. No.: 12/981,805

(22) Filed: Dec. 30, 2010

(65) Prior Publication Data

US 2012/0170522 A1 Jul. 5, 2012

(51) Int. Cl.
  G01R 31/08 (2006.01)
  H04W 4/00 (2009.01)
  H04W 12/08 (2009.01)
  H04W 12/06 (2009.01)
  H04W 88/02 (2009.01)
  H04W 88/16 (2009.01)

(52) U.S. Cl.
  CPC .............. *H04W 12/06* (2013.01); *H04W 12/08* (2013.01); *H04W 88/02* (2013.01); *H04W 88/16* (2013.01)
  USPC .................. 370/216; 370/329; 726/12; 726/7

(58) Field of Classification Search
  USPC ........................... 709/224–226; 370/216–228
  See application file for complete search history.

(56) References Cited

U.S. PATENT DOCUMENTS

| | | | |
|---|---|---|---|
| 2003/0067923 A1 | 4/2003 | Ju et al. | |
| 2005/0254504 A1* | 11/2005 | Ozu ............................... | 370/401 |
| 2008/0254793 A1* | 10/2008 | Panda et al. ................. | 455/435.1 |
| 2011/0131338 A1* | 6/2011 | Hu ................. | 370/338 |
| 2011/0171953 A1* | 7/2011 | Faccin et al. ............... | 455/426.1 |
| 2011/0196977 A1* | 8/2011 | Lynch et al. .................. | 709/229 |

FOREIGN PATENT DOCUMENTS

WO  WO 2006/071474  7/2006

OTHER PUBLICATIONS

3GPP Change Request 29.601 CR 021: "Standard method for information delivery (MSISDN; IP address) between GPRS and external PDN using RADIUS", $3^{rd}$ Generation Partnership Project (3GPP), Mobile Competence Centre, vol. CN WG3, No. Tdoc N3-010333, Jul. 16, 2001, pp. 1-11, XO050074687.
Partial European Search Report corresponding to EP 11 16 8911, mailed Aug. 12, 2011, 6 pages.

* cited by examiner

*Primary Examiner* — Ayaz Sheikh
*Assistant Examiner* — Mariela Vidal Carpio
(74) *Attorney, Agent, or Firm* — Harrity & Harrity, LLP

(57) ABSTRACT

A system is configured to: receive a message from a gateway device; identify one or more sessions corresponding to an identifier included in the message; and clear the one or more corresponding sessions. The identifier may correspond to a part of the gateway device where a session is stored or maintained for a mobile device to connect to a server device.

20 Claims, 7 Drawing Sheets

PARTIAL FAILURE MESSAGING

BACKGROUND

Cellular networks (e.g., 3 G networks, 4 G networks, etc) allow a mobile device (e.g., a smart phone, a mobile telephone device, etc.) to access a web service when an authentication device of a cellular network authenticates the mobile device. A gateway device (e.g., a packet data network (PDN) gateway (PGW)) may create a session for the mobile device and handle communication with the authentication device on behalf of the mobile device. For the mobile device to be authenticated, the gateway device may send a message to the authentication device to create a session for the mobile device on the authentication device. Ideally, the authentication device may maintain the session until the mobile device logs-off from the web service and/or disconnects from the cellular network.

However, a part (e.g., a card) of the gateway device that maintains the session for the mobile device may fail. Currently, the authentication device does not receive any information about the failure of the part until all parts of the gateway device fail, the gateway device reboots, and the gateway device transmits a message to the authentication device about the reboot. An extended period of time may pass (e.g., months) between when a first part of the gateway device fails and when the other parts of the gateway device fail. As a result, stale sessions (that should have already been cleared) are maintained by the authentication device for the extended period of time. Also, currently, the authentication device acts as though all parts of the gateway device failed in response to receiving any message from the gateway device indicating a failure. Therefore, the authentication device clears all of the sessions corresponding to the gateway device in response to any failure message from the gateway device. Accordingly, there is no way to communicate to the authentication device that only part of the gateway device failed and that only the sessions corresponding to the failed part need to be cleared.

SUMMARY

According to one aspect, a method may include: receiving a first message from a gateway device, where the first message may include a card identifier of a card of the gateway device; starting a first session for a user device based on the first message; receiving a second message from the gateway device, where the second message may include the card identifier; identifying one or more sessions, started by an authentication device, corresponding to the card identifier, where the one or more sessions comprise the first session; and clearing the one or more sessions.

According to another aspect, a non-transitory computer-readable medium may store a program for causing a computing device to perform a method. The method may include: receiving a message from a gateway device, where the message comprises an identifier corresponding to a part of the gateway device where a session is stored or maintained for a mobile device to connect to a server device; identifying one or more sessions, started by the computing device, corresponding to the identifier; and clearing the one or more sessions.

According to yet another aspect, a gateway device may include a first storage device to store first sessions; a second storage device to store second sessions; and a processor. The processor may receive a session request from a user device, where the session request includes a network identifier; transmit an access request to an authentication device in response to receiving the session request; receive an access confirmation from the authentication device in response to transmitting the access request; identify the first storage device based on the network identifier in the session request; create a session for the user device in the first storage device; and transmit a message to the authentication device, where the message comprises the network identifier. The session may be one of the first sessions. The first storage device may be allocated to store sessions for a network associated with the network identifier.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements. Also, the following detailed description does not limit the invention.

An implementation described herein may provide partial failure messaging. For example, a user of a mobile device may use the mobile device to initiate a process to connect to a web service through a network. The mobile device may transmit a request, to a gateway device of an access network, for the gateway device to create a session for the connection. The gateway device may create a session for the mobile device, in response to the request, on a part (e.g., on a card, on one card of multiple cards corresponding to an Access Point Name, etc.) of the gateway device. The gateway device may transmit a first message (e.g., an Accounting-Start message), to an authentication device, for the authentication device to start and maintain a corresponding session for the connection of the mobile device. The first message may include an identifier of the part of the gateway device that has the session for the connection. The authentication device may start and maintain the session in response to the first message. After a failure of only the part of the gateway device, the gateway device may transmit a second message (e.g., an Accounting-ON message), to the authentication device, indicating a failure of the part of the gateway device. The second message may include the identifier of the part of the gateway device that has failed. In response to the second message, the authentication device may identify and clear sessions that correspond to the failed part of the gateway device. The authentication device may identify the sessions for clearing based on the identifier of the part of the gateway device that has failed.

Figure 1:
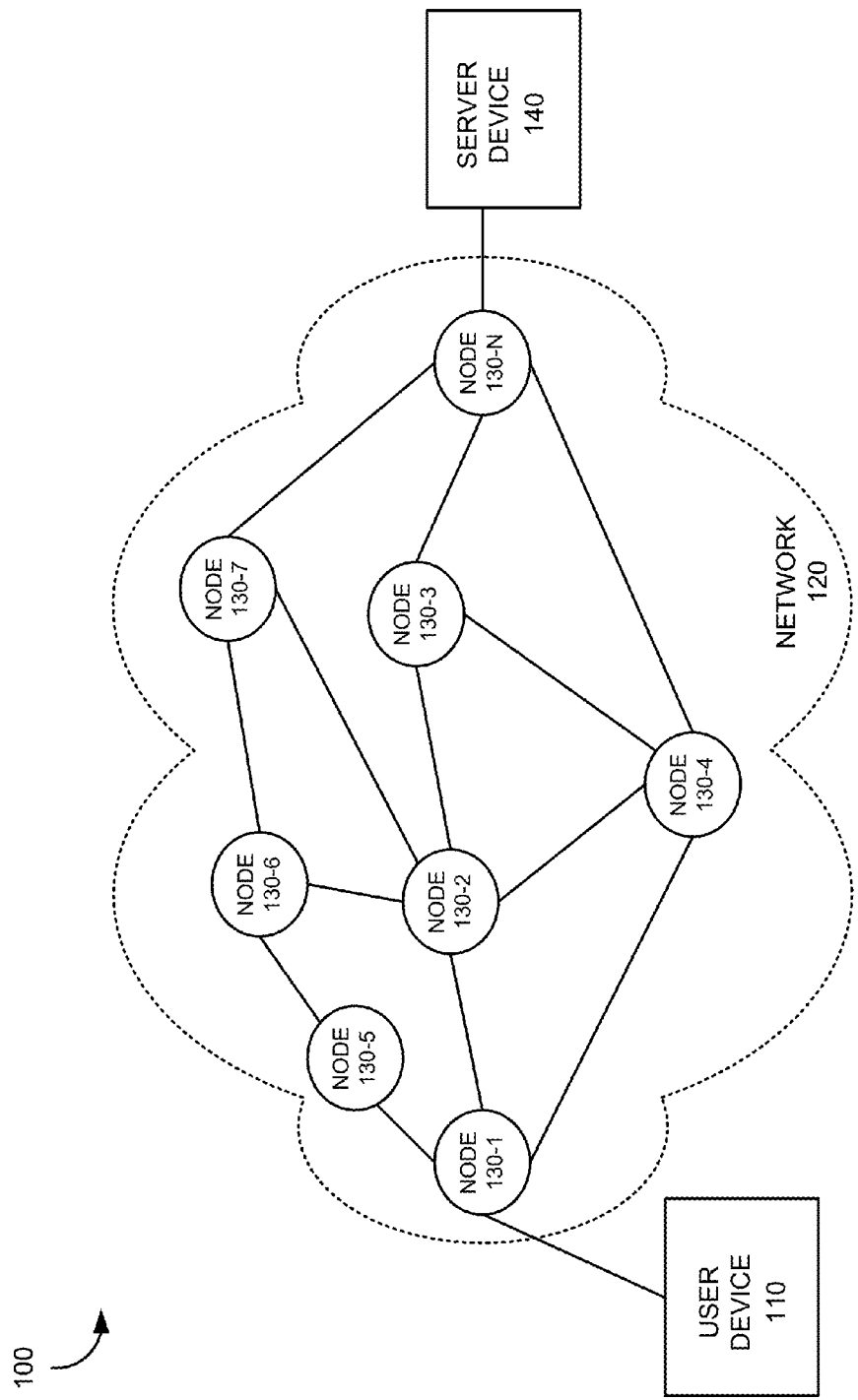
FIG. 1 is a diagram of an example environment in which systems and/or methods described herein may be implemented.

FIG. 1 is a diagram of an example environment 100 in which systems and/or methods described herein may be implemented. Environment 100 may include one or more of the following elements: a user device 110, a network 120, and a server device 140. While FIG. 1 shows a particular number and arrangement of devices, environment 100 may include additional, fewer, different, or differently arranged devices than are illustrated in FIG. 1.

User device 110 may represent any device capable of transmitting and/or receiving data to/from network 120. User device 110 may include any computation or communication device, such as a communication device that is capable of communicating with server device 140 via network 120. In one implementation, mobile device 110 may take the form of a smart phone, a personal digital assistant (PDA), a mobile telephone device, a laptop, a handheld computer, a personal media player, etc. User device 110 may allow a user of user device 110 to access a web service provided by server device 140 through network 120.

Server device 140 may represent any device capable of transmitting and/or receiving data to/from network 120. Server device 140 may represent a single server or a collection of multiple computing devices and/or computer systems. Server device 140 may provide one or more web services (e.g., a web site). Server device 140 may transmit data to user device 110 through network 120. User device 110 and server device 140 may be directly connected to network 120 or indirectly connected through a router, a switch, a bridge, a firewall, a gateway, etc. Server device 140 may also be part of network 120 and may operate as nodes 130.

Network 120 may represent a single network, multiple networks of a same type, or multiple networks of different types. For example, network 120 may include a cellular network (e.g., 3 G network, 4 G network), a wireless network (e.g., a general packet radio service (GPRS) network), a Public Switched Telephone Network (PSTN), a local area network (LAN), a wide area network (WAN) (e.g., the Internet), a metropolitan area network (MAN), a subset of the Internet, an ad hoc network, a fiber optic network (e.g., a fiber optic service (FiOS) network), or any combination of the aforementioned networks. A cellular network may include one or more of a radio access network (e.g., a long term evolution (LTE) network or an enhanced high rate packet data (eHRPD) network) and a wireless core network (e.g., referred to as an evolved packet core (EPC) network).

Network 120 may include network nodes 130-1, 130-2, . . . , 130-N (collectively referred to as "nodes 130" and individually as "node 130"). Nodes 130 may connect via a number of network links. The network links may include wired and/or wireless links. Each node 130 may connect to one or more other nodes 130. While FIG. 1 shows a particular number and arrangement of nodes 130, network 120 may include additional, fewer, different, or differently arranged nodes 130 than are illustrated in FIG. 1. One or more nodes 130 may be outside of network 120 or may be part of one or more other networks.

Node 130 may include a network device that transmits data and/or facilitates transmission of data between user device 110 and server device 140. For example, node 130 may take the form of a routing device, a switching device, a multiplexing device, or a device that performs a combination of routing, switching, and/or multiplexing functions. In one implementation, node 130 may be a digital device. In another implementation, node 130 may be an optical device. In yet another implementation, node 130 may be a combination of a digital device and an optical device. Examples of nodes 130 are described below in reference to FIG. 2.

Figure 2:
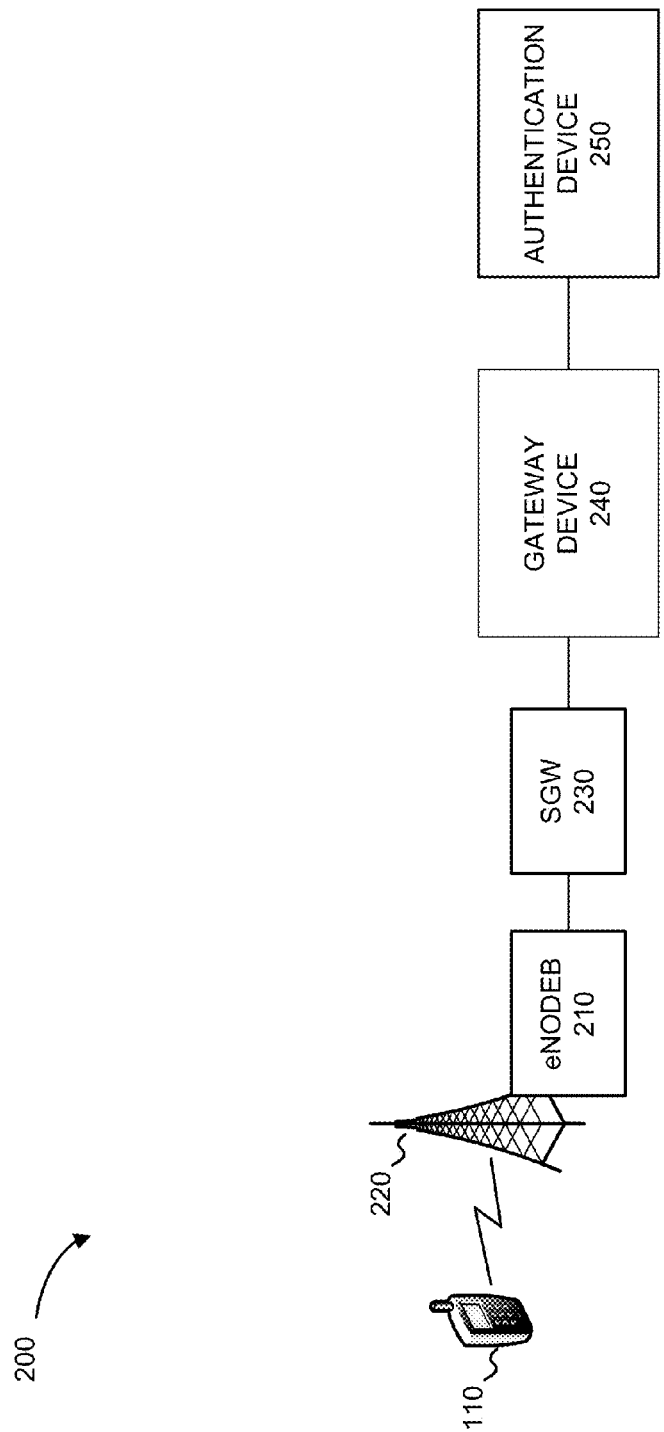
FIG. 2 is a diagram of an example portion of the example environment of FIG. 1.

FIG. 2 is a diagram of an example portion 200 of environment 100. Portion 200 may represent an access network that may connect user device 110 to a target network (e.g., core network) that connects to server device 140. In other words, portion 200 may authenticate user device 110 for user device 110 to be allowed to use network 120 to access a web service provided by, for example, server device 140. Portion 200 may include an eNodeB 210, an antenna 220, a serving gateway (SGW) 230, a gateway device 240, and an authentication device 250. Each one of eNodeB 210, antenna 220, SGW 230, gateway device 240, and authentication device 250 may correspond to one or more of nodes 130 in FIG. 1.

eNodeB 210 may be a radio interface node. eNodeB 210 may be associated with corresponding antenna 220. eNodeB 210 may be connected (e.g., via a wired connection, via a X2 interface, via radio network controllers (RNCs)) to one or more other eNodeBs. eNodeB 210 may include hardware to communicate with user device 110 using WDCMA/TD-SCDMA (Wideband Code Division Multiple Access/Time Division Synchronous Code Division Multiple Access) as the air interface technology.

SGW 230 may include one or more devices that perform signaling conversion between the transport (e.g., X2 interface) used within an access network and the transport (e.g., IP) used within target networks. SGW 230 may route and forward user data packets, while also acting as the mobility anchor for the user plane during inter-eNodeB handovers and as the anchor for mobility between LTE and other technologies. SGW 230 may also manage and store customer device contexts (e.g., parameters of an IP bearer service and network internal routing information).

Gateway device 240 may include a packet data network gateway (PGW) and/or a gateway GPRS support node (GGSN). Gateway device 240 may provide connectivity from user device 110 to external packet data networks by being the point of exit and entry of traffic for user device 110. User device 110 may have simultaneous connectivity with gateway device 240 and one or more other gateway devices for accessing multiple packet data networks. Gateway device 240 may perform policy enforcement, packet filtering, and other services relating to the access of user device 110 to an external packet data network. Gateway device 240 may be connected to SGW 230, one or more other SGWs, authentication device 250, and/or one or more other authentication devices. Gateway device 240 may also be connected to a core network (e.g., the external packet data network, the Internet) that may provide the connection for user device 110 to server device 140. As further described below in reference to FIG. 3, gateway device 240 may be composed of one or more cards. As further described below in reference to FIG. 4, each one of one the cards may be composed of one or more processing elements.

A user may initiate a session using user device 110. User device 110 may transmit a request for the session to gateway device 240. Gateway device 240 may receive the request for the session from user device 110 via eNodeB 210, antenna 220, SGW 230, and/or one or more other components of one or more networks. Gateway device 240 may generate and transmit an access request, based on the request for the session, and transmit the access request to authentication device 250. Gateway device 240 may receive an access confirmation (or denial) from authentication device 250. In response to receiving the access confirmation, gateway device 240 may create a session corresponding to user device 110 and transmit a message (e.g., an Accounting-Start message), to authentication device 250, for authentication device 250 to start a session corresponding to user device 110. Gateway device 240 may also generate and transmit a message (e.g., an Accounting-ON message) indicating a failure of gateway device 240 or a part (e.g., a card, a processing element, one or more cards corresponding to an APN, etc.) of gateway device

240 to authentication device 250. Gateway device 240 may include, in the message, an identifier corresponding to the part.

Authentication device 250 may include a Remote Authentication Dial In User Service (RADIUS) server, an Authentication, Authorization, and Accounting (AAA) server, and/or one or more other devices that provides authentication services. Authentication device 250 may be composed of one or more servers and/or one or more other computing devices. Authentication device 250 may be implemented as a combination of hardware and software, or hardware. Authentication device 250 may be connected to gateway device 240 and/or one or more other gateway devices.

Authentication device 250 may receive an access request, for user device 110, from gateway device 240. The access request may include a secret (e.g., a password, a personal identifier, etc.) corresponding to user device 110. Authentication device 250 may determine whether to authenticate user device 110 (i.e., allow access to user device 110) based on whether the secret matches a key used to determine whether to authenticate user device 110. Authentication device 250 may receive a message (e.g., an Accounting-Start message), from gateway device 240, and create and maintain a session for user device 110 in response to the message. Authentication device 250 may also receive a message (e.g., an Accounting-ON message), from gateway device 240, indicating a failure of gateway device 240 or a part (e.g., a card, a processing element, cards corresponding to an APN, etc.) of gateway device 240. The message may include an identifier corresponding to the part. Authentication device 250 may identify one or more sessions, including the session for user device 110, that authentication device 250 maintains corresponding to the identifier (sessions on gateway device 240, corresponding to the sessions identified on authentication device 250, were maintained by the part of gateway device 240 identified by the identifier). Authentication device 250 may clear only the identified session(s) instead of clearing all sessions corresponding to gateway device 240.

Figure 3:
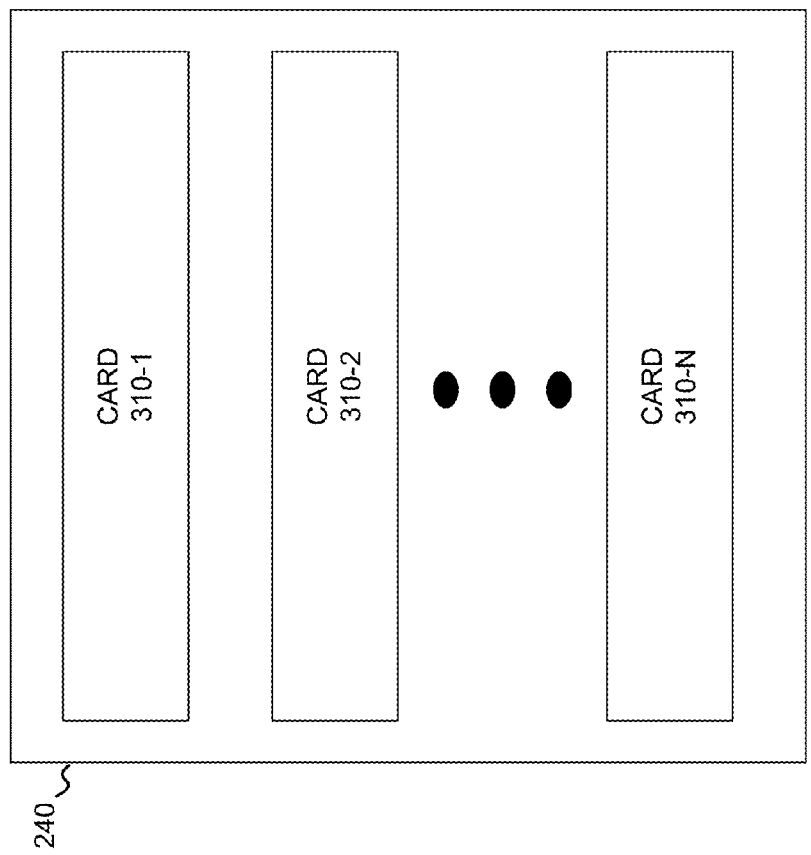
FIG. 3 is a diagram of an example gateway device.

FIG. 3 is a diagram of example gateway device 240. Gateway device 240 may include cards 310-1, 310-2, ..., 310-N (collectively referred to as "cards 310" and individually as "card 310"). Card 310 may include a collection of components that perform a particular function. Multiple sessions, corresponding to different user devices 110, may be anchored/processed by on one card 310. A different identifier (e.g., node-ID) may be assigned to each one of cards 310. In one implementation, one or more of cards 310 may be reserved for a target network (e.g., an IP packet data network with which user device 110 wants to communicate). In another implementation, multiple target networks may be allocated to one card 310. Each target network may have a different identifier (e.g., caller-station-ID). An identifier for a target network may be an Access Point Name (APN) (e.g., juniper.net). Gateway device 240 may include the identifier(s) in message(s) that gate gateway device 240 transmits to authentication device 250.

Figure 4:
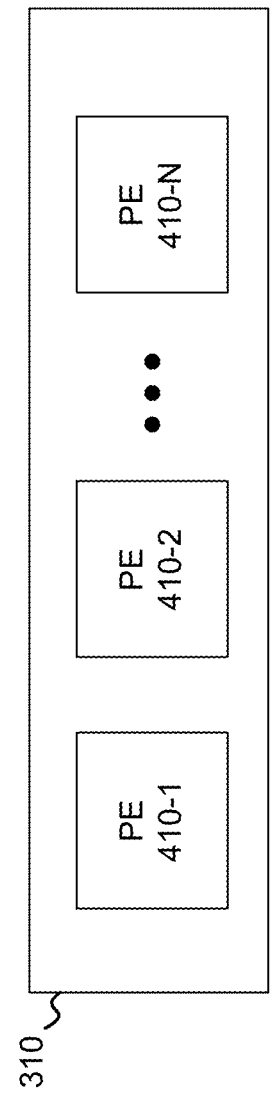
FIG. 4 is a diagram of an example card of a gateway device.

FIG. 4 is a diagram of card 310 of gateway device 240. Card 310 may include processing elements (PEs) 410-1, 410-2, ..., 410-N (collectively referred to as "processing elements 410" and individually as "processing element 410"). Processing element 410 may include a computing device. Processing element 410 may act (e.g., create and process a session) independently from other processing elements 410. Multiple sessions, corresponding to different user devices 110, may be anchored on one processing element 410. In one implementation, each processing element 410, of a particular card, may be assigned the same identifier. In another implementation, different identifiers may be assigned to each one of processing elements 410. Herein, each one of processing elements 410 may be considered a part of gateway device 240.

Figure 5:
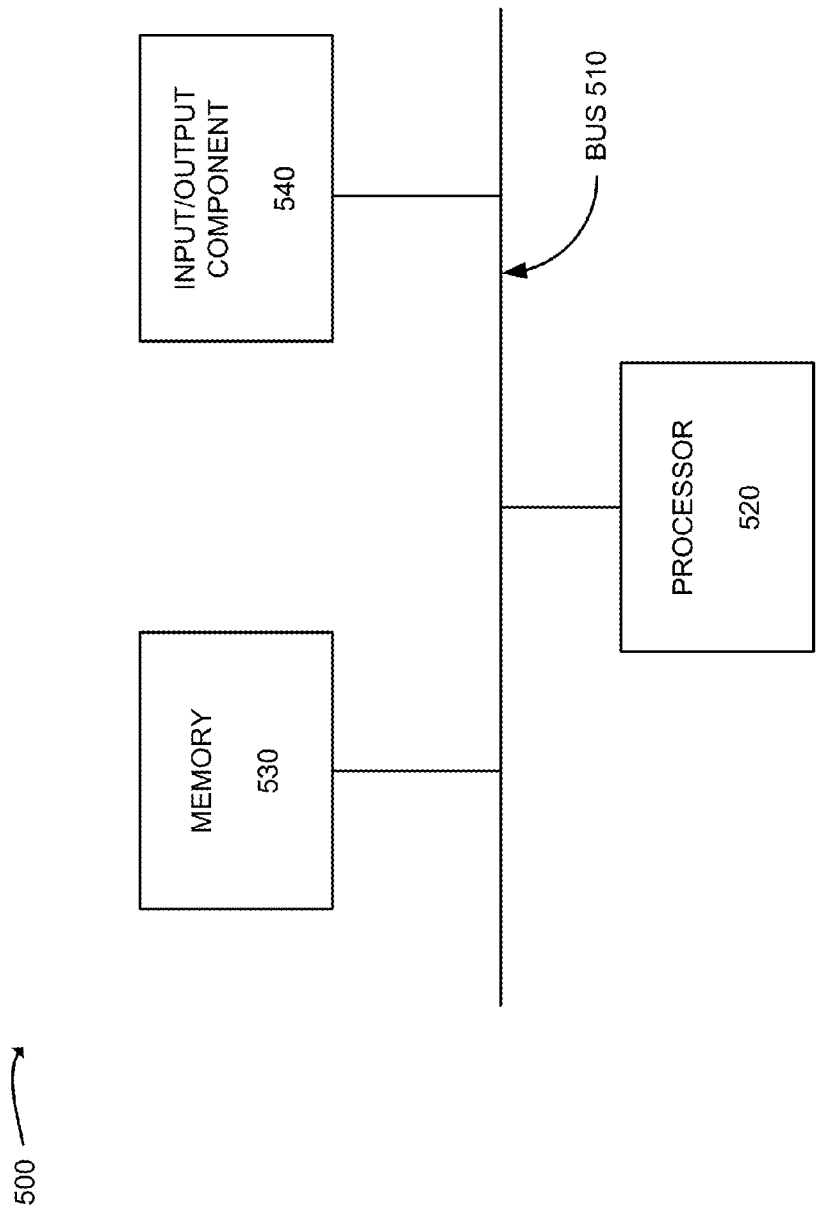
FIG. 5 is a diagram of example components of one or more of the devices of FIGS. 1-4.

FIG. 5 is a diagram of example components of a device 500, which may correspond to node 130, eNodeB 210, SGW 230, gateway device 240, authentication device 250, and/or processing elements 410. Each one of node 130, eNodeB 210, SGW 230, gateway device 240, authentication device 250, and/or processing elements 410 may include one or more devices 500 and/or one or more of each one of the components of device 500. As shown in FIG. 5, device 500 may include a bus 510, a processor 520, a memory 530, and an input/output component 540.

Bus 510 may include a path that permits communication among the components of device 500. Processor 520 may include a processor, a microprocessor, or processing logic (e.g., an application specific integrated circuit (ASIC) or a field programmable gate array (FPGA)) that may interpret and execute instructions. Memory 530 may include a random access memory (RAM) or another type of dynamic storage device that may store information and instructions for execution by processor 520; a read only memory (ROM) or another type of static storage device that may store static information and instructions for use by processor 520; a magnetic and/or optical recording medium and its corresponding drive; and/or a removable form of memory, such as a flash memory.

Input/output component 540 may include a mechanism that permits an operator to input information to device 500, such as a keyboard, a keypad, a mouse, a button, a pen, a touch screen, etc., and/or a mechanism that outputs information to the operator, including a display, a light emitting diode (LED), a speaker, etc. Additionally, or alternatively, input/output component 540 may include any transceiver-like mechanism that enables device 500 to communicate with other devices and/or systems. For example, input/output component 540 may include a wired interface (e.g., an Ethernet interface, an optical interface, etc.), a wireless interface (e.g., a radio frequency (RF) interface, a wireless fidelity (Wi-Fi) interface, a Bluetooth interface, etc.), or a combination of a wired interface and a wireless interface.

As will be described in detail below, device 500 may perform certain operations. Device 500 may perform these and other operations in response to processor 520 executing software instructions (e.g., computer program(s)) contained in a computer-readable medium, such as memory 530, a secondary storage device (e.g., hard disk, CD-ROM, etc.), etc. A computer-readable medium may be defined as a non-transitory memory device. A memory device may include a space within a single physical memory device or spread across multiple physical memory devices. The software instructions may be read into memory 530 from another computer-readable medium or from input/output component 540. The software instructions contained in memory 530 may cause processor 520 to perform processes described herein. Alternatively, hardwired circuitry may be used in place of or in combination with software instructions to implement processes described herein. Thus, implementations described herein are not limited to any specific combination of hardware circuitry and software.

Although FIG. 5 illustrates example components of device 500, in other implementations, device 500 may include additional components, fewer components, different components, or differently arranged components than those illustrated in FIG. 5 and described herein.

Figure 6:
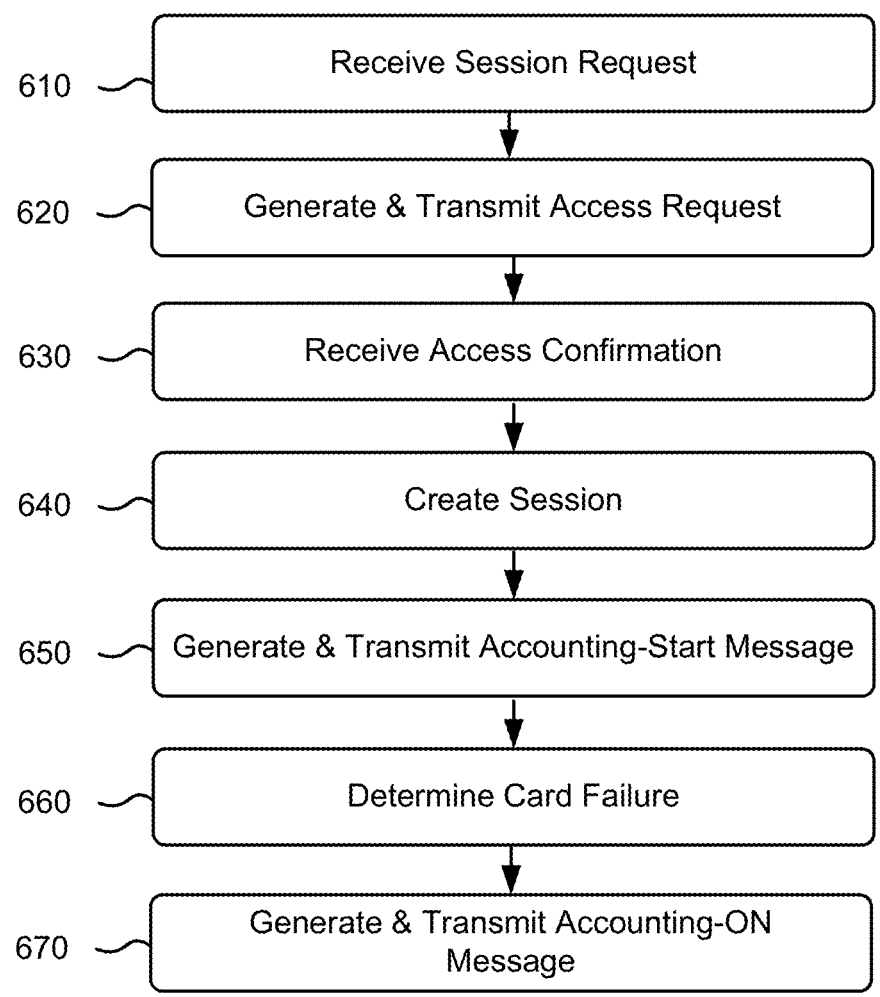
FIG. 6 is a flowchart of an example process for providing partial failure messaging by a gateway device.

FIG. 6 is a flowchart of an example process 600 for providing partial failure messaging. In one implementation, process 600 may be performed by gateway device 240 and/or one or more other devices.

Process 600 may include receiving a session request (block 610). For example, a user of user device 110 may initiate a process to use a web service provided by service device 140. User device 110 may create a session request to allow user device 110 to connect to a (target) network for the user to be able to access and use the web service. The session request may include a secret (e.g., a username and a password) to authenticate user device 110 to allow the user device 110 to use the target network (e.g., cellular network) via which user device 110 can communicate with server device 140. User device 110 may transmit the session request, to eNodeB 210, which may forward the session request to gateway device 240 via SGW 230. Gateway device 240 may receive the session request. In another implementation, user device 110 may transmit the secret, to gateway device 240, separately and after transmitting the session request (e.g., in response to a request for the secret from gateway device 240).

An access request may be generated and transmitted (block 620). For example, gateway device 240 may determine, based on the session request, that user device 110 is seeking access to the target network, to use a web service provided by server device 140. In response, gateway device 240 may proceed to authenticate user device 110. To do so, gateway device 240 may generate an access request for user device 110. The access request may include the secret received from user device 110. Gateway device 240 may transmit the access request to authentication device 250.

An access confirmation may be received (block 630). For example, authentication device 250 may receive the access request from authentication device 250. Authentication device 250 may authenticate user device 110 based on the secret included in the access request. If user device 110 is authenticated by authentication device 250, authentication device 250 may generate an access confirmation for user device 110. Authentication device 250 may transmit the access confirmation to gateway device 240. Gateway device 240 may receive the access confirmation from authentication device 250.

A session may be created (block 640). For example, based on the access confirmation, gateway device 240 may determine that user device 110 was authenticated by authentication device 250. In response, gateway device 240 may create a session for user device 110 based on the session request received from user device 110. Gateway device 240 may store/maintain the created session in a processing element 410 of one of the cards 310 of gateway device 240. In another implementation, gateway device 240 may allocate one or more cards 310 or a part of a card 310 (e.g., one or more processing elements 410) for sessions corresponding to an access point name (APN). The APN may correspond to the target network that user device 110 has requested to access in the session request. The session request may include an identifier (e.g., a caller-station-ID used to identify an access point (the caller-station-ID may be an APN) for the APN. Gateway device 240 may identify one of the cards 310 corresponding to the APN based on the session request. Gateway device 240 may store/maintain the created session in a processing element 410 of the one of the identified cards 310.

An Accounting-Start message may be generated and transmitted (block 650). For example, gateway device 240 may generate an Accounting-Start message after creating the session for user device 110. The purpose of the Accounting-Start message may be to signal to authentication device 250 a start of user device 110's network access and to prompt authentication device 250 to react accordingly. The Accounting-Start message may include an Internet Protocol (IP) address of gateway device 240, the identifier (e.g., a Node-ID) corresponding to the card 310 of gateway device 240 on which the session for user device 110 is maintained, and/or the identifier (e.g., a caller-station-ID which may be the APN) corresponding to the APN. Gateway device 240 may transmit the Accounting-Start message to authentication device 250. The Accounting-Start message may prompt authentication device 250 to start a corresponding session, and accounting, for user device 110 on authentication device 250. The Accounting-Start message may also prompt authentication device 250 to store/record information about the session created on gateway device 240 for user device 110, including the identifier of the card 310 and/or the APN, and other connection data (e.g., a username, an identifier of a port gateway device 240, a type of the port, connection start time, etc.).

A card 310 failure may be determined (block 660). For example, a card failure may occur of the card 310 of gateway device 240, which was maintaining the session for user device 110 before the card failure. The card failure may include a software failure and/or a hardware failure. Gateway device 240 may lose all of the sessions on the card 310 due to the card failure. In one implementation, gateway device 240 and/or another controlling device may determine the card failure. In response, gateway device 240 may reboot the card 310 for the card 310 to be operational again (by, for example, shutting down and restarting processing element(s) 410 of the card 310).

An Accounting-ON message may be generated and transmitted for card 310 (block 670). For example, after the card failure, gateway device 240 may generate an Accounting-ON message. The purpose of the Accounting-ON message may be to identify gateway device 240 and/or a part of gateway device 240 (e.g., card 310) that is going online and to prompt authentication device 250 to clear sessions based on the Accounting-ON message. The Accounting-ON message may include the IP address of gateway device 240, the identifier of the card 310 at which the card failure occurred, and/or the APN corresponding to the card 310. Gateway device 240 may transmit the Accounting-ON message to authentication device 250. In response to the Accounting-ON message, authentication device 250 may identify sessions corresponding to the identifiers (the IP address of gateway device 240, the identifier of the card 310 at which the card failure occurred, and/or the APN corresponding to the card 310). Authentication device 250 may clear only the identified sessions in response to the Accounting-ON message.

In one implementation, after transmitting the Accounting-Start message (block 650), a user of user device 110 may initiate a process to terminate the session being maintained by gateway device 240 for user device 110 (e.g., the user logs-off the web service provided by server device 140, the user disconnects user device 110 from network 120, etc.). In response, gateway device 240 may end the session for user device 110 on a card of gateway device 240. Gateway device 240 may also generate and transmit an Accounting-OFF message to authentication device 250. The accounting message may prompt authentication device 250 to end (e.g., delete) a session on authentication device 250, for user device 110, corresponding to the session ended on gateway device 240 and, accordingly, to stop accounting for the session. Authentication device 250 may continue to maintain the session, for user device 110, as a stale session on authentication device 250 if, for whatever reason (e.g., the Accounting-OFF message is not received), the session is not ended in response to the Accounting-OFF message.

In another implementation, gateway device 240 may keep track of a quantity (e.g., 10) of different sessions on each one of the cards 310 of gateway device 240. Gateway device 240 may, after gateway device 240 ends a session for user device 110, decrease the quantity of different sessions for a card 310, which maintained the session, by one. If the quantity of different sessions on the card 310 is equal to zero after decreasing the quantity by one, gateway device 140 may generate an Accounting-OFF message. The Accounting-OFF message may include an IP address of gateway device 240, an identifier of the card 310 which now maintains zero sessions, and/or one or more APN(s) corresponding to the card 310. Gateway device 240 may transmit the Accounting-OFF message to authentication device 250. Authentication device 250 may identify any stale sessions maintained by authentication device 250 corresponding to the card 310 of gateway device 240 based on the identifier(s). In response to the Accounting-OFF message, authentication device 250 may delete all of the identified stale sessions, corresponding to the card 310 and/or APN, from authentication device 250.

Figure 7:
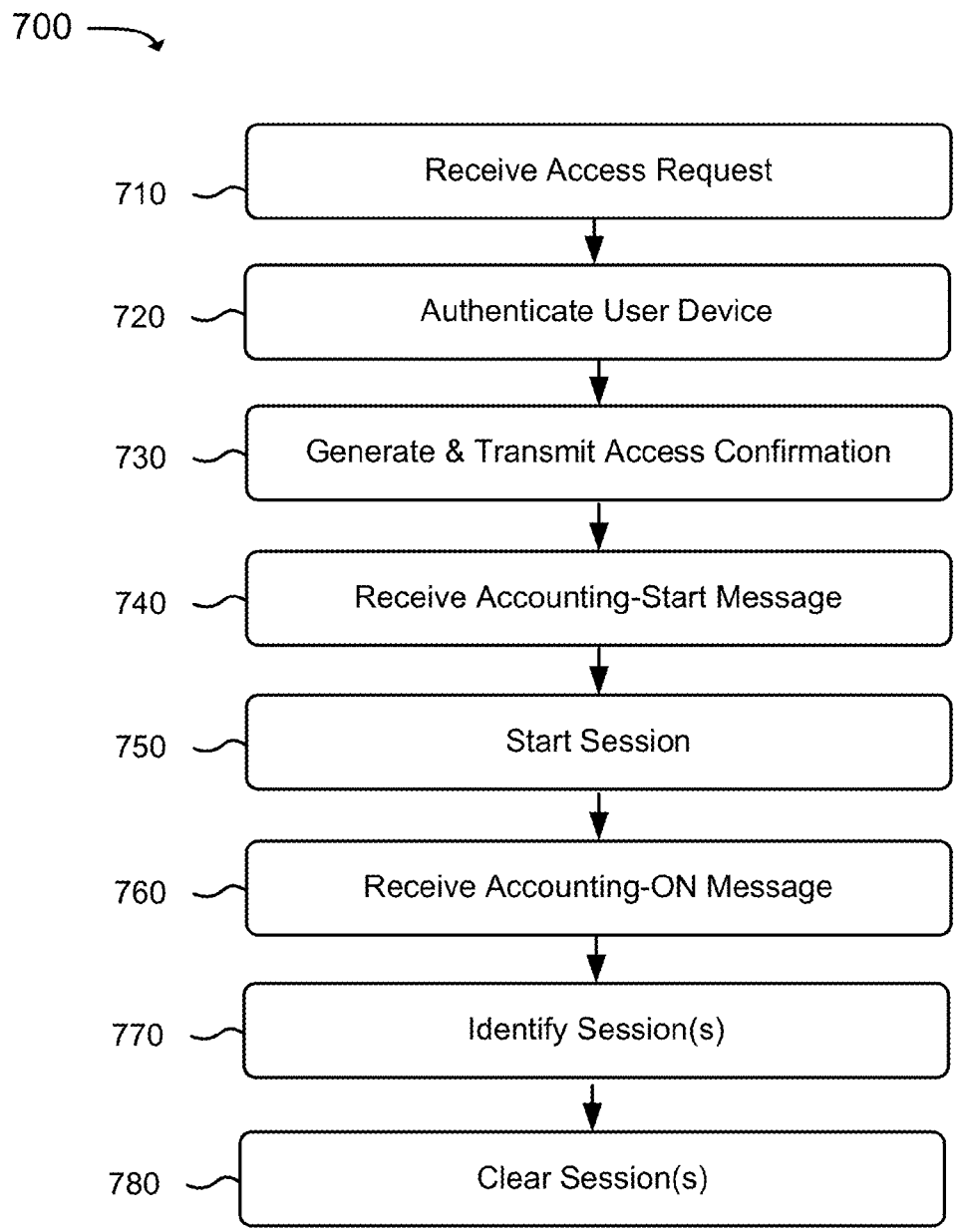
FIG. 7 is a flowchart of an example process for providing partial failure messaging by an authentication device.

FIG. 7 is a flowchart of an example process 700 for providing partial failure messaging. Process 700 may be performed by authentication device 250 and/or one or more other devices.

Process 700 may include receiving an access request (block 710). For example, gateway device 240 may receive a session request from user device 110. In response, gateway device 240 may generate and transmit an access request, for user device 110, to authentication device 250. The access request may include a secret (e.g., a username and a password) provided by user device 110. Authentication device 250 may receive the access request from gateway device 240.

User device 110 may be authenticated (block 720). For example, authentication device 250 may retrieve the secret from the access request. Authentication device 250 may also retrieve a comparison key for user device 110. The comparison key may include information regarding the secret that was previously provided by a user of user device 110 (e.g., when the user registered with authentication device 250 or another device of network 210). Authentication device 250 may compare the secret to the comparison key. If the secret matches the comparison key, authentication device 250 may authenticate user device 110.

An access confirmation may be generated and transmitted (block 730). For example, after authenticating user device 110, authentication device 250 may determine to allow user device 110 to access a target network to communicate with server device 140, as requested in the session request provided by user device 110 to gateway device 240. Based on the determination, and in response to the access request from gateway device 240, authentication device 250 may generate the access confirmation for user device 110. The access confirmation may include information indicating the authentication of user device 110 by authentication device 250. Authentication device 250 may transmit the access confirmation to gateway device 240.

An Accounting-Start message may be received (block 740). For example, after gateway device 240 receives the access confirmation, gateway device 240 may generate and transmit an Accounting-Start message to authentication device 250. The Accounting-Start message may include instructions for authentication device 250 to start a session for user device 110 and start an accounting process for the session. The Accounting-Start message may also include information identifying a part of gateway device 240 that created and/or maintains a corresponding session for user device 110. For example, the information may include an IP address of gateway device 240, an identifier (e.g., a Node-ID) corresponding to a card 310 of gateway device 240 on which the session for user device 110 is maintained, and/or an identifier of an APN (e.g., a caller-station-ID which may be the APN) corresponding to the session. One or more cards 310 of gateway device 240 may correspond to the APN. Authentication device 250 may receive the Accounting-Start message from gateway device 240.

A session may be started (block 750). For example, authentication device 250 may start the session based on the Accounting-Start message. Authentication device 250 may store information about the identifiers, included in Accounting-Start message, that correspond to the session. Thereafter, authentication device 250 may maintain the session and perform accounting for the session of user device 110.

An Accounting-ON message may be received (block 760). For example, a card failure of a card 310 of gateway device 240 may occur. Thereafter, gateway device 240 may generate an Accounting-ON message. The Accounting-ON message may include identifying information, such as, an IP address of gateway device 240, an identifier (e.g., a Node-ID) corresponding to a card 310 of gateway device 240 on which the session for user device 110 is maintained, and/or an identifier (e.g., a caller-station-ID) of an APN, that identifies the card 310 at which the card failure occurred. Authentication device 250 may receive the Accounting-ON message from gateway device 240.

Session(s) may be identified (block 770). For example, authentication device 250 may retrieve the identifying information from the Accounting-ON message. If the Accounting-ON message does not include any identifying message of a card 310 (e.g., a Node-ID) or an APN (e.g., a caller-station-ID), authentication device 250 may identify all sessions maintained by authentication device 250 that correspond to gateway device 240 based on the IP address of gateway device 240 included in the Accounting-ON message. If the Accounting-ON message includes identifying information (e.g., a Node-ID or a caller-station-ID) that corresponds to one or more card(s) 310 of gateway device 240, authentication device 250 may identify sessions that correspond only to the one or more cards 310.

The session(s) may be cleared (block 780). For example, authentication device 250 may clear the identified sessions. As a result, the accounting information stored previously for the different sessions may be cleared as well. Authentication device 250 may re-start a session for user device 110 based on instructions from gateway device 240.

In another implementation, a failure of processing element 410 of card 310 may occur. Gateway device 240 may generate an Accounting-ON message that identifies (includes an identifier of) the individual processing element 410. Gateway device 240 may transmit the Accounting-ON message to authentication device 250. Authentication device 250 may identify and clear sessions that correspond only to the processing element(s) 410 identified in the Accounting-ON message, rather than clearing all sessions corresponding to one or more cards 310.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 6 and 7, the order of the blocks may be modified in other implementations. Further, non-dependent blocks may be performed in parallel.

It will be apparent that example aspects, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code-it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving, by a computing device, a first message from a gateway device,
     the gateway device including a plurality of cards,
     the plurality of cards including a plurality of processing elements, and
     the first message including an identifier of a processing element of the plurality of processing elements;
   starting, by the computing device, a session for a user device based on the first message;
   receiving, by the computing device and from the gateway device, a second message indicating a failure associated with the gateway device,
   determining, by the computing device, that the second message includes the identifier of the processing element;
   identifying, by the computing device, one or more sessions corresponding to the identifier of the processing element based on determining that the second message includes the identifier of the processing element,
     the one or more sessions including the session; and
   clearing, by the computing device and after identifying the one or more sessions, the one or more sessions without clearing one or more other sessions that correspond to one or more other processing elements of the plurality of processing elements.

2. The method of claim 1,
   where the first message further includes a network identifier of a target network,
   where the second message further includes the network identifier, and
   where identifying the one or more sessions comprises:
     identifying, based on the second message, the one or more sessions corresponding to the identifier of the processing element and the network identifier.

3. The method of claim 2, where the network identifier is an access point name.

4. The method of claim 1, further comprising:
   receiving an access request from the gateway device;
   authenticating the user device based on the access request;
   generating an access confirmation based on authenticating the user device; and
   transmitting the access confirmation to the gateway device.

5. The method of claim 1,
   where the first message is an Accounting-Start message, and
   where the second message is an Accounting-ON message.

6. The method of claim 1,
   where the gateway device is at least one of a packet data network gateway (PGW) or a gateway GPRS support node (GGSN), and
   where the computing device is at least one of a remote authentication dial in user service (RADIUS) server or an Authentication, Authorization, and Accounting (AAA) server.

7. The method of claim 1, further comprising:
   receiving a third message from the gateway device,
     the third message including the identifier of the processing element;
   identifying, based on receiving the third message, one or more stale sessions corresponding to the identifier of the processing element; and
   ending the one or more stale sessions after identifying the one or more stale sessions.

8. A non-transitory computer-readable medium storing instructions, the instructions comprising:
   one or more instructions that, when executed by at least one processor of a computing device, cause the at least one processor to:
     receive, from a gateway device, a message indicating a failure associated with the gateway device,
       the gateway device including a plurality of cards, and
       the plurality of cards including a plurality of processing elements,
     determine that the message includes an identifier corresponding to a processing element of the plurality of processing elements, and
       the processing element corresponding to one or more particular sessions that enable one or more mobile devices to connect to a server device;
     identify the one or more particular sessions corresponding to the identifier corresponding to the processing element based on determining that the message includes the identifier corresponding to the processing element; and
     clear the one or more particular sessions after identifying the one or more particular sessions without clearing other sessions that correspond to one or more other processing elements of the plurality of processing elements.

9. The non-transitory computer-readable medium of claim 8, where the server device is connected to a target network corresponding to a card of the plurality of cards.

10. The non-transitory computer-readable medium of claim 8, where the instructions further comprise:
    one or more instructions that, when executed by the at least one processor, cause the at least one processor to:
      receive an access request from the gateway device,
        the access request including particular information to authenticate a particular mobile device of the one or more mobile devices;
      retrieve a key corresponding to the particular mobile device;

determine whether to authenticate the particular mobile device by comparing the particular information and the key; and transmit an access confirmation to the gateway device when the particular information matches the key.

11. The non-transitory computer-readable medium of claim 8, where the instructions further comprise:
one or more instructions that, when executed by the at least one processor, cause the at least one processor to:
receive an Accounting-Start message from the gateway device; and
create a particular session based on the Accounting-Start message,
the particular session being one of the one or more particular sessions.

12. The non-transitory computer-readable medium of claim 11,
where the Accounting-Start message comprises the identifier, and
where the instructions further comprise:
one or more instructions that, when executed by the at least one processor, cause the at least one processor to:
store the identifier in association with the particular session.

13. The non-transitory computer-readable medium of claim 8,
where the plurality of cards include a first card and a second card,
where the first card is reserved for a first target network,
where the second card is reserved for a second target network, and
where the first card and the second card include the one or more other processing elements and the processing element.

14. A gateway device comprising:
a first card that is allocated to store information regarding first sessions that are associated with a first network;
a second card that is allocated to store information regarding second sessions that are associated with a second network,
the first card including a plurality of processing elements, and
the first network being different from the second network; and
a processor to:
create a session for a user device,
store information associated with the session in a particular processing element of the plurality of processing elements of the first card,
the session being one of the first sessions,
transmit, based on creating the session, a first message to an authentication device,
the first message including an identifier of the particular processing element,
identify a failure that is limited to the particular processing element,
generate, based on identifying the failure that is limited to the particular processing element, a second message that includes an identifier associated with the particular processing element, and
transmit the second message to the authentication device,
the authentication device clearing one or more sessions, of the first sessions, that correspond to the identifier of the particular processing element, without clearing one or more other sessions, of the first sessions, that correspond to one or more other processing elements of the plurality of elements, based on the second message, and
the session being one of the one or more sessions.

15. The gateway device of claim 14, where the processor is further to:
end another session, of the second sessions, created for another user device, and
decrease a quantity of the second sessions by one after ending the other session.

16. The gateway device of claim 14, where the processor is further to:
determine that a quantity of the second sessions is equal to zero,
generate a third message based on determining that the quantity of the second sessions is equal to zero, and
transmit the third message to the authentication device.

17. The gateway device of claim 16, where the third message includes information to prompt the authentication device to clear all the second sessions.

18. The gateway device of claim 14,
where the first message is an Accounting-Start message, and
where the second message is an Accounting-ON message.

19. The gateway device of claim 14, where the processor is further to:
reboot the particular processing element without rebooting the one or more other processing elements based on determining that the failure is limited to the particular processing element.

20. The gateway device of claim 14, where, when creating the session, the processor is to:
receive a session request from the user device,
transmit an access request to the authentication device based on receiving the session request,
receive an access confirmation from the authentication device as a response to the access request, and
create the session for the user device based on receiving the access confirmation.

* * * * *